No. 889,829. PATENTED JUNE 2, 1908.
A. L. VALENTINE & C. G. DAHL.
MILLING CUTTER.
APPLICATION FILED APR. 18, 1906.
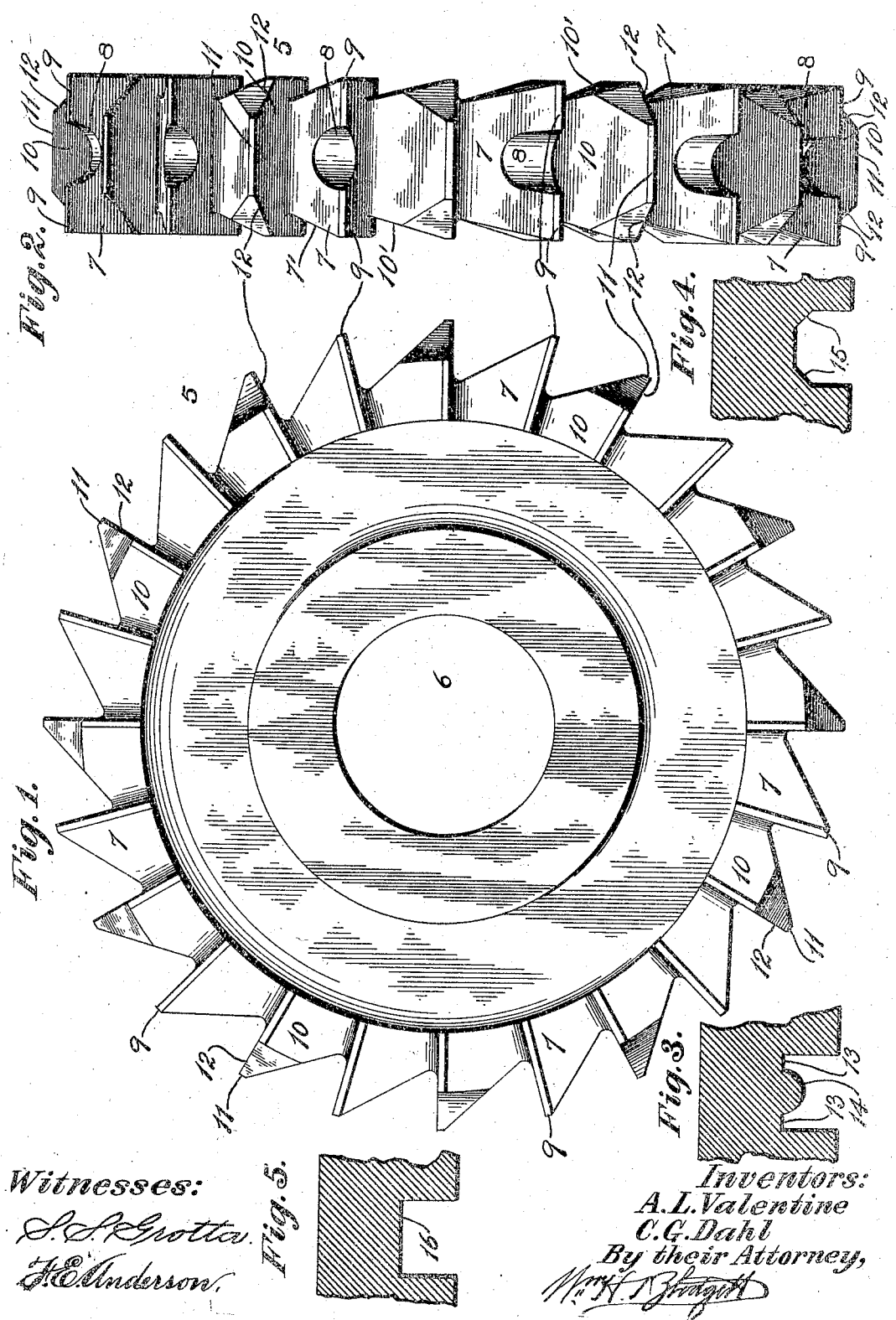
Witnesses:
S. S. Grotta
F. E. Anderson
Inventors:
A. L. Valentine
C. G. Dahl
By their Attorney,

UNITED STATES PATENT OFFICE.

AUGUST L. VALENTINE AND CARL G. DAHL, OF HARTFORD, CONNECTICUT, ASSIGNORS TO PRATT & WHITNEY COMPANY, OF HARTFORD, CONNECTICUT, A CORPORATION OF NEW JERSEY.

MILLING-CUTTER.

No. 889,829.   Specification of Letters Patent.   Patented June 2, 1908.

Application filed April 18, 1906. Serial No. 312,405.

*To all whom it may concern:*

Be it known that we, AUGUST L. VALENTINE and CARL G. DAHL, citizens of the United States and of Sweden, respectively, residing at Hartford, in the county of Hartford and State of Connecticut, have jointly invented certain new and useful Improvements in Milling-Cutters, of which the following is a specification.

This invention relates to milling-cutters or similar tools, and has for its object an improved construction of the teeth of the same, whereby division of the cutting-action of said teeth is provided for, clogging due to flowage of the metal or of the chips is prevented, and a cut having clean, sharp surfaces is the result.

A further object of the invention is the provision of a tool of the character mentioned provided with teeth having grooved or recessed edge-surfaces, and cutting-edges at each side of said recessed surfaces, and also having teeth alternating with the grooved teeth, and provided with straight cutting-edges and with inclined cutting-edges diverging from said straight cutting-edges.

Other objects of the invention will be set forth in the detailed description which now follows.

In the accompanying drawings, Figure 1 is a side elevation of a milling-cutter embodying the invention. Fig. 2 is an edge view of said cutter; and Figs. 3, 4, and 5 are detail sectional views, illustrating the action of the alternate teeth upon material undergoing operation.

Like numerals designate similar parts throughout the several views.

Referring to the drawings, the numeral 5 designates a cutter of the kind described, said cutter having an axial opening 6, in its hub for the reception of its supporting shaft or arbor. On its periphery this cutter is provided with a series of teeth 7, each tooth having a groove or depression 8, shown located at the center of its cutting-edge, although it may be differently disposed, and also having straight cutting-edges 9, one at each side of said groove or depression. Following each tooth 7 is a tooth 10 having a straight cutting-edge 11, and side cutting edges 12 diverging from said intermediate straight edge 11.

It will be understood from the drawings that the teeth 7 and 10 are alternately arranged with relation to each other around the periphery of the cutter-disk, and that the cutting-edges 9 of each tooth 7 and 11 of each tooth 10 are concentric to the axis of the tool. To provide clearance for the chips, each alternate tooth 7 is inclined on its sides as at 7' and each alternate tooth 10 is similarly inclined as at 10'. From what has been stated it follows that the action of the cutting-edges 9 of the teeth 7 is to reduce material on lines 13 and leave intermediate said lines a slight protuberance or rib 14, conforming in shape to that of the recess 8 (see Fig. 3).

Attention now being invited to Fig. 4, it will be seen that the cutting-edge 11 of each alternate tooth 10, will remove the slight rib or protuberance 14, and will leave the work with slightly inclined walls 15 at its sides, as shown in said figure, said inclined walls being removed by the following straight-cutting-edges 9 of the next alternate tooth 7, so that the result is either a groove having a straight bottom wall 16, Fig. 5, or work of any kind under operation having a right-line surface when the feed is arrested. In this manner a division of labor is carried out by alternating the teeth of the improved cutter, and the chips produced by the cutting-action find clearance, so that clogging is effectually prevented.

While useful on metal of any material, the cutter may be employed with advantage with what are known as the "soft metals," such as aluminum, copper and others having similar qualities. When such soft metals are subjected to a milling-operation, clean-cutting of the chips, as in the case of iron and steel, is frequently impossible on account of the tendency of said material, as the tooth starts to remove the chip therefrom, to become displaced and flow laterally, thereby causing clogging, while in a cutter of the kind mentioned this tendency of the material is entirely obviated, and a clean and sharp incision is the result.

It is found in practice that a tool having alternate teeth of the character above set forth will work rapidly and accurately without unnecessary friction upon the material under operation, and that a clean cut with sharply defined walls or surfaces will be produced in said material.

Having thus described our invention, what we claim is:

1. A tool of the class described, comprising a disk having sets of peripheral teeth, each tooth of one set being grooved and provided with cutting-edges on the sides of the groove, and each tooth of the other set having a main cutting-edge opposite the groove of the preceding tooth, and also having cutting-edges diverging from said main cutting-edge.

2. A milling-cutter comprising a disk having teeth concentric with its axis, and alternately disposed substantially as described, one tooth being provided with two cutting-edges separated by an intermediate groove or depression, and the following tooth having one cutting-edge at its end, and other cutting-edges diverging from said end cutting-edge.

In testimony whereof we affix our signatures in presence of two witnesses, at Hartford, Conn., this 26th day of March, 1906.

AUGUST L. VALENTINE.
C. G. DAHL.

Witnesses:
F. G. ECHOE,
E. D. CLARK.